(12) United States Patent
Seok et al.

(10) Patent No.: US 9,397,737 B2
(45) Date of Patent: Jul. 19, 2016

(54) METHOD AND APPARATUS FOR INDICATING DESTINATION STATIONS IN WLAN SYSTEM SUPPORTING MULTI-USER MULTIPLE INPUT MULTIPLE OUTPUT

(75) Inventors: Yong Ho Seok, Anyang-si (KR); Byeong Woo Kang, Anyang-si (KR); Yu Jin Noh, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/382,522

(22) PCT Filed: Jul. 6, 2010

(86) PCT No.: PCT/KR2010/004384
§ 371 (c)(1),
(2), (4) Date: Jan. 5, 2012

(87) PCT Pub. No.: WO2011/005004
PCT Pub. Date: Jan. 13, 2011

(65) Prior Publication Data
US 2012/0106531 A1 May 3, 2012

Related U.S. Application Data

(60) Provisional application No. 61/223,679, filed on Jul. 7, 2009, provisional application No. 61/307,427, filed on Feb. 23, 2010.

(30) Foreign Application Priority Data

May 18, 2010 (KR) .......................... 10-2010-0046255

(51) Int. Cl.
*H04W 48/08* (2009.01)
*H04B 7/04* (2006.01)
*H04W 52/34* (2009.01)
*H04W 84/12* (2009.01)
*H04L 5/00* (2006.01)
(Continued)

(52) U.S. Cl.
CPC ........... *H04B 7/0452* (2013.01); *H04W 52/346* (2013.01); *H04L 5/0023* (2013.01);
(Continued)

(58) Field of Classification Search
CPC .............. H04B 7/0452; H04L 25/0204; H04L 25/0226; H04L 5/0023; H04L 5/0048; H04W 24/00; H04W 48/08; H04W 4/06; H04W 52/346; H04W 84/12; H04W 88/08; H04W 8/26
See application file for complete search history.

(56) References Cited

U.S. PATENT DOCUMENTS 8,472,383 B1 * 6/2013 Banerjea et al. ............... 370/328
2007/0058605 A1 * 3/2007 Meylan ............ H04W 72/0406
370/346
(Continued)

FOREIGN PATENT DOCUMENTS

WO 2009-027931 3/2009

*Primary Examiner* — Andrew Lai
*Assistant Examiner* — M Mostazir Rahman
(74) *Attorney, Agent, or Firm* — Lee, Hong, Degerman, Kang & Walmey; Jonathan Kang; Michael Monaco (57) ABSTRACT

A method of indicating destination stations, performed by an access point (AP), in a wireless local area network (WLAN) system supporting multi-user multiple input multiple output (MU-MIMO) is provided. The method includes transmitting a sounding request frame to the plurality of destination stations to transmit a sounding frame used for channel estimation between the AP and each destination station, receiving the sounding frame in response to the sounding frame request from each station, and transmitting a first data frame spatially multiplexed with respect to the plurality of destination stations by performing channel estimation on the basis of the sounding frame, wherein the sounding request frame comprises a group identifier (ID) indicating the plurality of destination stations.

4 Claims, 4 Drawing Sheets

(51) Int. Cl.
*H04L 25/02* (2006.01)
*H04W 4/06* (2009.01)
*H04W 8/26* (2009.01)
*H04W 24/00* (2009.01)
*H04W 88/08* (2009.01)

(52) U.S. Cl.
CPC .......... *H04L 5/0048* (2013.01); *H04L 25/0204* (2013.01); *H04L 25/0226* (2013.01); *H04W 4/06* (2013.01); *H04W 8/26* (2013.01); *H04W 24/00* (2013.01); *H04W 48/08* (2013.01); *H04W 84/12* (2013.01); *H04W 88/08* (2013.01)

(56) References Cited

U.S. PATENT DOCUMENTS

| | | | |
|---|---|---|---|
| 2007/0135059 | A1 | 6/2007 | Yomo et al. |
| 2007/0206504 | A1 | 9/2007 | Koo et al. |
| 2009/0296674 | A1* | 12/2009 | Ekl et al. ........................ 370/338 |
| 2010/0061342 | A1* | 3/2010 | Frederiks et al. ............. 370/331 |
| 2010/0220678 | A1* | 9/2010 | Wentink ......................... 370/329 |
| 2010/0260138 | A1* | 10/2010 | Liu et al. ....................... 370/330 |
| 2011/0103280 | A1* | 5/2011 | Liu et al. ....................... 370/311 |
| 2011/0150004 | A1* | 6/2011 | Denteneer et al. ............ 370/476 |

* cited by examiner

| B0 | B1 | B2    B5 | B6    B8 | B9    B15 |
|---|---|---|---|---|
| Reserved (300) | TRQ (310) | MAI (320) | MFSI (330) | MFB/ASELC (340) |

Bits: 1, 1, 4, 3, 7

METHOD AND APPARATUS FOR INDICATING DESTINATION STATIONS IN WLAN SYSTEM SUPPORTING MULTI-USER MULTIPLE INPUT MULTIPLE OUTPUT

CROSS-REFERENCE TO RELATED APPLICATIONS

This application is the National Stage filing under 35 U.S.C. 371 of International Application No. PCT/KR2010/004384, filed on Jul. 6, 2010, which claims the benefit of earlier filing date and right of priority to Korean Application No. 10-2010-0046255, filed on May 18, 2010, and also claims the benefit of U.S. Provisional Application Ser. No. 61/307,427, filed on Feb. 23, 2010, and 61/223,679, filed on Jul. 7, 2009, the contents of which are all incorporated by reference herein in their entirety.

TECHNICAL FIELD

The present invention relates to wireless communications, and more particularly, to a method and apparatus for indicating destination stations in a wireless local area network (WLAN) system supporting multi-user multiple input multiple output (MU-MIMO).

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. However, an IEEE 802.11n medium access control (MAC)/physical layer (PHY) protocol is not effective to provide a throughput of above 1 Gbps. This is because the IEEE 802.11n MAC/PHY protocol is designed for an operation of a station (STA), that is, an STA having one network interface card (NIC), and thus when a frame throughput is increased while conforming to the conventional IEEE 802.11n MAC/PHY protocol, a resultant additional overhead is also increased. Consequently, there is a limitation in increasing a throughput of a wireless communication network while conforming to the conventional IEEE 802.11n MAC/PHY protocol, that is, a single STA architecture.

Therefore, to achieve a data processing rate of above 1 Gbps in the wireless communication system, a new system different from the conventional IEEE 802.11n MAC/PHY protocol (i.e., the single STA architecture) is required. A very high throughput (VHT) WLAN system is a next version of the IEEE 802.11n WLAN system, and is one of IEEE 802.11 WLAN systems which have recently been proposed to support a data processing rate of above 1 Gbps in a MAC service access point (SAP).

The VHT WLAN system allows simultaneous channel access of a plurality of VHT STAs for the effective use of a radio channel. For this, a multi-user multiple input multiple output (MU-MIMO)-based transmission using multiple antennas is supported. The VHT AP can perform spatial division multiple access (SDMA) transmission for transmitting spatially multiplexed data to the plurality of VHT STAs.

In a very high throughput (VHT) wireless location area network (WLAN) system, an access point (AP) can transmit data simultaneously to several stations (STAs) by using a multi-user multiple input multiple output (MU-MIMO) technique. In this case, there is a need to consider a method of indicating a plurality of destination STAs, i.e., a target of data transmission, by the AP to STAs in a basic service set (BSS), and a media access control (MAC) frame format for supporting the method.

SUMMARY OF INVENTION

Technical Problem

The present invention provides a method and apparatus for indicating a plurality of destination stations in a wireless local area network (WLAN) system supporting multi-user multiple input multiple output (MU-MIMO).

The present invention also provides a method of performing transmission by adaptively determining transmit power according to a channel condition or the like of each of a plurality of destination stations in a WLAN system supporting MU-MIMO.

Solution to Problem

In an aspect of the present invention, a method of indicating destination stations, performed by an access point (AP), in a wireless local area network (WLAN) system supporting multi-user multiple input multiple output (MU-MIMO), includes transmitting a sounding request frame to the plurality of destination stations to transmit a sounding frame to be used for channel estimation between the AP and each destination station, receiving the sounding frame in response to the sounding frame request from each station, and transmitting a first data frame spatially multiplexed with respect to the plurality of destination stations by performing channel estimation on the basis of the sounding frame, wherein the sounding request frame comprises a group identifier (ID) indicating the plurality of destination stations.

The group ID may be included in a very high throughput (VHT) control field included in a media access control (MAC) header of the sounding request frame The frame control field included in the MAC header may include an identifier indicating whether the VHT control field is included in the MAC header of the sounding request frame.

The method may further include receiving an association request frame from each station to request to associate with the AP, and transmitting an association response frame to each station in response to the association request frame, wherein the association request frame comprises information indicating whether the VHT control field is included in the MAC header.

The group address may be set in a receiver address field included in the MAC header of the sounding request frame when transmitted.

The method may further include receiving transmit power control information from each of destination station receiving the data frame, and transmitting a second data frame to the plurality of destination stations by regulating transmit power on the basis of the transmit power control information.

The transmit power control information may be received by using an acknowledgement (ACK) frame or a block ACK frame from each destination station in response to reception of the first data frame.

The transmit power control information may be received by using a frame transmitted subsequently to an acknowledgement (ACK) frame or a block ACK frame from each destination station in response to reception of the first data frame.

The transmit power control information may be obtained by using a difference between an effective signal-to-noise ratio (SNR) corresponding to a modulation and coding scheme (MCS) applied to the first data frame and an effective SNR corresponding to channel capacity of a channel used in transmission of the first data frame.

In another aspect of the present invention, an access point (AP) includes a processor, and a transceiver, operationally coupled to the processor, for transmitting and receiving a frame, wherein the processor transmits to a plurality of destination stations a sounding request frame which is used to transmit a sounding frame to be used for channel estimation between the AP and each destination station and which comprises a group identifier (ID) indicating the plurality of destination stations, receives the sounding frame in response to the sounding request frame from each station, and transmits a first data frame spatially multiplexed with respect to the plurality of destination stations by performing channel estimation on the basis of the sounding frame.

Advantageous Effects of Invention

According to the present invention, overhead can be reduced when a group identifier (ID) of a plurality of destination stations is introduced to indicate the destination stations in a wireless local area network (WLAN) system supporting multi-user multiple input multiple output (MU-MIMO).

By using transmit power adaptively determined based on a channel condition or the like of each destination station in the WLAN system supporting MU-MIMO, power consumption can be saved while maintaining reliability of data transmission.

MODE FOR THE INVENTION

Hereinafter, exemplary embodiments of the present invention will be described with reference to the accompanying drawings.

A wireless local area network (WLAN) system according to an embodiment of the present invention includes at least one basic service set (BSS). The BSS is a set of stations (STAs) successfully synchronized to communicate with one another. The BSS can be classified into an independent BSS (IBSS) and an infrastructure BSS.

The BSS includes at least one STA and an access point (AP). The AP is a functional medium for providing a connection to STAs in the BSS through respective wireless media. The AP can also be referred to as other terminologies such as a centralized controller, a base station (BS), a scheduler, etc.

The STA is any functional medium including a medium access control (MAC) and wireless-medium physical layer (PHY) interface satisfying the institute of electrical and electronics engineers (IEEE) 802.11 standard. The STA may be an AP or a non-AP STA. Hereinafter, the STA refers to the non-AP STA unless specified otherwise. The STA may also be referred to as other terminologies such as a user equipment (UE), a mobile station (MS), a mobile terminal (MT), a hand-held device, an interface card, etc.

The STA can be classified into a very high throughput (VHT)-STA, a high throughput (HT)-STA, and a legacy (L)-STA. The HT-STA is an STA supporting IEEE 802.11n. The L-STA is an STA supporting a previous version of IEEE 802.11n, for example, IEEE 802.11a/b/g. The L-STA is also referred to as a non-HT STA.

Figure 1:
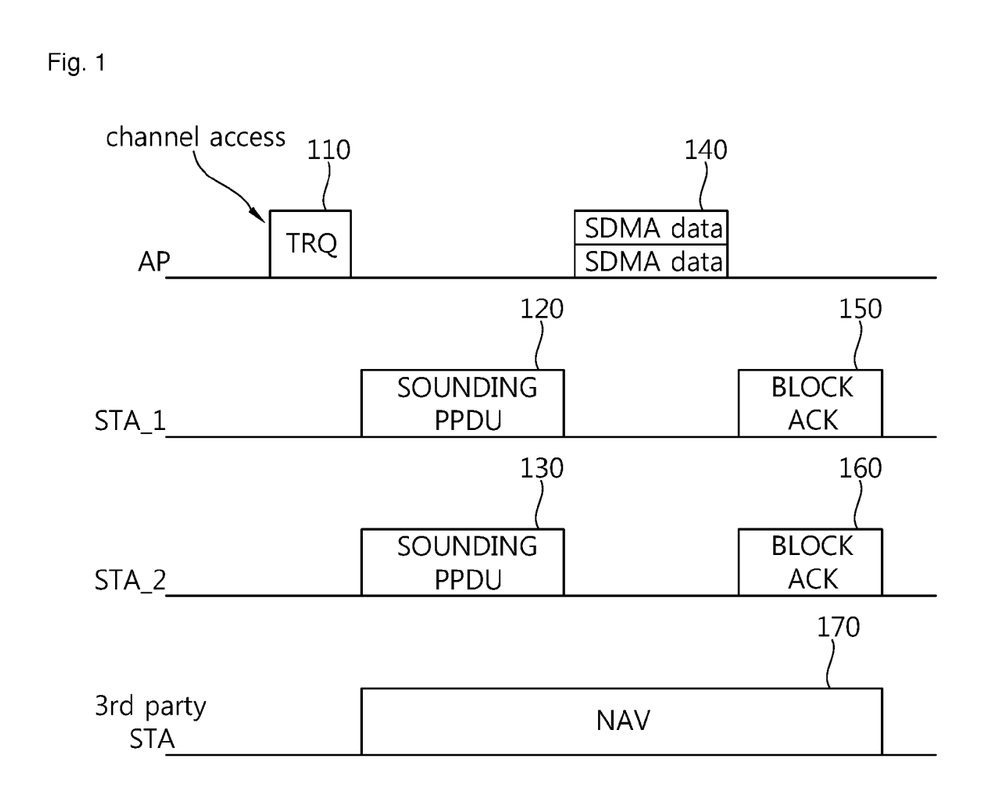
FIG. 1 shows an example of downlink (DL) frame transmission based on multi user-multiple input multiple output (MU-MIMO).

FIG. 1 shows an example of downlink (DL) frame transmission based on multi user-multiple input multiple output (MU-MIMO).

DL transmission denotes frame transmission from an AP to an STA. Hereinafter, frame transmission from the AP to the STA will be referred to as DL transmission, and frame transmission from the STA to the AP will be referred to as uplink (UL) transmission.

In DL MU-MIMO, the AP transmits a training request (TRQ) frame 110 to destination STAs (i.e., STA_1 and STA_2) which are intended for AP to transmit a frame after channel access. The TRQ frame 110 is a frame for requesting transmission of a sounding physical layer convergence procedure (PLCP) protocol data unit (PPDU) to be used to estimate a channel between the destination STA and the AP before the AP transmits the data frame to the destination STAs.

In response to the TRQ frame 110, the destination STAs transmit a sounding PPDU 120 and a sounding PPDU 130. In this case, third party STAs, other than the destination STAs, hear the TRQ frame 110, configure a network allocation vector (NAV) 170, and defers channel access.

Upon receiving the sounding PPDU 120 and the sounding PPDU 130, the AP obtains channel information by performing channel estimation on the STA_1 and the STA_2. The channel information can be used in beamforming for reducing interference of the plurality of destination STAs. On the basis of the obtained channel information, the AP can transmit a steered spatial division multiple access (SDMA) data frame 140 to the STA_1 and the STA_2. The SDMA data frame 140 is a frame transmitted by performing spatial multiplexing on the STA_1 and the STA_2 on the basis of the channel information obtained by performing channel estimation by using the sounding PPDU received by the AP from each destination STA.

Upon receiving the SDMA data frame 140, the destination STAs respond to the AP by transmitting a block acknowledgement (ACK) frame 150 and a block ACK frame 160.

In the DL MU-MIMO transmission process of FIG. 1, the AP has to transmit, to STAs in the BSS, information for indicating a destination STA to which a frame is transmitted among STAs in a BSS in association with the AP. That is, the TRQ frame 110 of the example of FIG. 1 has to include the information for indicating the destination STA. An STA, which receives the TRQ frame 110 including the information for indicating the destination STA, can know whether the STA is the destination STA by confirming the destination STA indication information included in the TRQ frame 110, and thereafter can transmit the sounding PPDU or configure the NAV according to whether the STA is the destination STA.

The present invention proposes a method of indicating a plurality of destination STAs as a target of frame transmission and a MAC frame format supporting the method in the WLAN system supporting MU-MIMO transmission.

The method of indicating the plurality of destination STAs as the target of frame transmission in the WLAN system supporting MU-MIMO transmission proposed in the present invention is that AP transmits information on the plurality of destination STAs by including the information in a VHT control field of a MAC frame header. The VHT control field includes information for supporting a function of a VHT WLAN system, for example, for the support of MU-MIMO, for the use of a channel having a bandwidth of 80 MHz or higher, etc. The VHT control field includes necessary information in order to allow a MAC layer to be able to perform a function required to the VHT WLAN system, so that it can be supported in a frame unit. Hereinafter, a MAC frame structure proposed in the present invention will be described.

Figure 2:
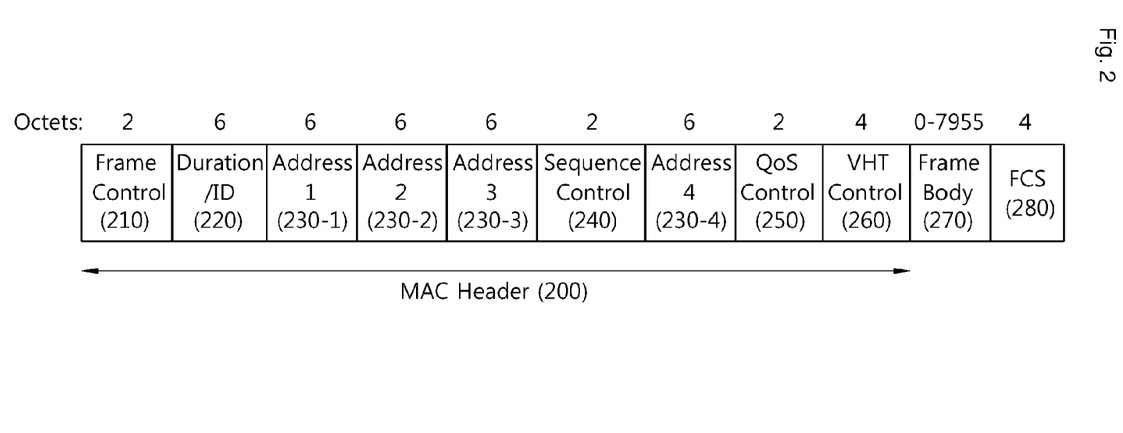
FIG. 2 illustrates an example of a media access control (MAC) frame format according to an embodiment of the present invention.

FIG. 2 illustrates an example of a MAC frame format according to an embodiment of the present invention.

The MAC frame format according to the embodiment of the present invention includes a MAC header 200, a frame body 270, and a frame check sequence (FCS) 280.

The MAC header 200 includes a frame control field 210, a duration/ID field 220, four address fields 230-1 to 230-4, a sequence control field 240, a quality of service (QoS) control field 250, and a VHT control field 260.

The frame control field 210 may include protocol version information, information indicating a type and subtype of a frame, information for analyzing the four address fields, information indicating whether there are additional fragments to be transmitted later when a higher-level packet is fragmented by a MAC layer, information indicating whether the frame is retransmitted, information reporting whether an STA enters a power saving mode, information indicating whether there is a buffered frame to be transmitted to the STA, information for data protection and authentication, and an order bit.

In the MAC frame format according to the embodiment of the present invention, the order bit included in the frame control field has a length of 1 bit, and if the MAC frame includes the VHT control field, the order bit can be set to '1' to report to a receiving STA that the VHT control field 260 is included in the frame. In the MAC frame format conforming to the conventional IEEE 802.11n standard, the order bit included in a management frame or QoS data is used for reporting that an HT control field is included in a specific MAC frame. Therefore, when the MAC frame is transmitted by setting the order bit to '1', the STA receiving this frame confirms the order bit and thus can know that the HT control field or the VHT control field is included in the received MAC frame.

Additional information may be further transmitted so that the receiving STA can determine whether a control field received subsequently to the QoS field of the MAC frame is the HT control field or the VHT control field. That is, there is a need to know whether to use a VHT MAC frame including the VHT control field or an HT MAC frame including the HT control field of the IEEE 802.11n standard in a process of exchanging the frame between an AP and the STA or between STAs.

For this, according to the embodiment of the present invention, information for reporting to a peer STA a type of the MAC frame format to be used in the process of exchanging the frame between the AP and the STA and between the STAs can be transmitted.

For example, type information of a MAC frame to be used can be included within an association request frame and an association response frame exchanged in an association process between the AP and the STA. When the STA transmits the association request frame to the AP, an extended capability information element (IE) included in the association request frame according to the embodiment of the present invention includes a MAC frame format field including the type information of the MAC frame. The STA can configure and transmit the HT MAC frame or the VHT MAC frame as a type of the MAC frame to be used in frame exchange after being associated in the MAC frame format field. By receiving the association request frame, the AP can know a type of the MAC frame to be used by using the MAC frame format of the extended capability IE included in the association request frame. The AP confirms the type of the MAC frame to be used for the STA by using the association response frame. In this case, the association response frame can transmit MAC frame type information to the STA to confirm the MAC frame type to be used by using the MAC frame format field of the extended capability IE.

That is, the association process determines the MAC frame type to be used later between the AP and the STA. If once it is determined to use the VHT MAC frame by exchanging the association request frame and the association response frame, an STA or AP which receives the MAC frame transmitted by setting its order bit to '1' can know that the VHT control field is transmitted subsequent to the QoS control field.

If the VHT MAC frame type no longer needs to be used or if the HT MAC frame needs to be used, the AP and the STA can change the MAC frame type in use by performing a re-association process. For this, the re-association process can transmit a frame by determining a MAC frame type to be changed in the MAC frame format field of the extended capability IE of a re-association request frame and a re-association response frame.

The type of the MAC frame to be used between the STAs also needs to be reported to the peer STA even in case of direct link setup (DLS) or tunneled direct link setup (TDLS) in which frame exchange is achieved through a direct link (DL) between the STAs.

In case of the DLS, the MAC frame type information is delivered to the peer STA via the AP in the DL setup process. A DLS initiator exchanges a DLS request frame and a DLS response frame with a DLS responder which establishes the DL setup. In this case, a type of the MAC frame to be used in the MAC frame format field of the extended capability IE of the DLS request frame and the DLS response frame is determined and then is transmitted/received. The DLS responder receives the DLS request frame in the DL setup process, and confirms the MAC frame type information of the MAC frame format field. The DLS responder determines the confirmed MAC frame type in the MAC frame format field of the extended capability IE of the DLS response frame, and delivers it to the DLS initiator.

Similarly to the aforementioned case of using DLS, the present invention can also equally apply to a case of using TDLS proposed to support the DLS in the IEEE 802.11a/b/g WLAN system which does not support QoS but has currently been commercialized. That is, type information of the MAC frame to be used is delivered to the peer STA by using the MAC frame format field of the extended capability IE of the TDLS request frame and the TDLS response frame. In this case, the TDLS request frame and the TDLS response frame are encapsulated in a data frame format and are then transmitted to the peer STA via the AP.

The duration/ID field of the MAC frame header may have a length of 2 octets, and is used to configure an NAV of the STA. According to a value defined in bits 14 and 15, the duration/ID field may indicate a frame transmitted in a non-contention duration or a PS-poll frame.

The MAC frame header may include the four address fields 230-1, 230-2, 230-3, and 230-4. Each address has a length of 48 bits. According to a bit value, the address can be configured to a unicast address, a multicast address, and a broadcast address. The four address fields may indicate any one of a destination address (DA), a source address (SA), a receiver address (RA), a transmitter address (TA), and a BSS ID.

The sequence control field 240 can be used to de-fragment a fragmented frame and to discard a duplicate frame.

The frame body 270 is also referred to as a data field, and is used to transfer higher-layer data from a transmitting STA to a receiving STA.

The FCS 280 is also referred to as a cyclic redundancy check (CRC), and is used to allow the STA to check integrity of a received frame. When the frame is transmitted to a radio interface, the FCS is calculated before the frame is sent to a radio frequency (RF) link. The receiving STA calculates the FCS from the received frame and compares the calculation result with the received FCS to determine whether there is an error in the frame transmission process.

The VHT control field 260 of the MAC frame format proposed in the present invention includes a link adaptation control sub-field. The link adaptation control sub-field includes information which is transmitted by being included in the VHT control field and which is required to estimate a channel between the transmitting STA (or the AP in DL MU-MIMO transmission) and the receiving STA.

Figure 3:
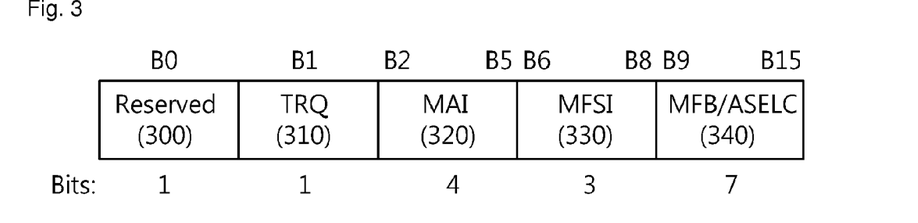
FIG. 3 shows a link adaptation control field based on the institute of electrical and electronics engineers (IEEE) 802.11n standard.

FIG. 3 shows a link adaptation control field based on the IEEE 802.11n standard. The link adaptation control field specified in the IEEE 802.11n standard includes a reserved bit 300, a TRQ bit 310 for indicating whether to request transmission of a sounding PPDU used in channel estimation, an MAI bit 320 for indicating modulation and coding scheme (MCS) or antenna selection, an MFSI bit 330 for indicating an MCS feedback order, and an MFB/ASELC bit 340 for indicating MCS feedback and antenna selection command/data.

The TRQ bit 310 of the conventional IEEE 802.11n standard has a length of 1 bit as shown in FIG. 3, and is used to indicate that the receiving STA is requested to transmit a sounding PPDU if the TRQ bit from STA or AP as a transmitter is set to '1', whereas transmission of the sounding PPDU is not requested when the TRQ bit is set to '0'. In the IEEE 802.11n standard, the TRQ bit is used to allow the AP to support a single STA which can support MIMO transmission using multiple antennas, i.e., single-user MIMO (SU-MIMO). Therefore, the present invention proposes to modify this method in order to support MU-MIMO for simultaneously transmitting frames to a plurality of destination STAs.

According to an embodiment of the present invention, the information for indicating the destination STA can be transmitted by being included in the TRQ field in the VHT WLAN system supporting MU-MIMO.

Figure 4:
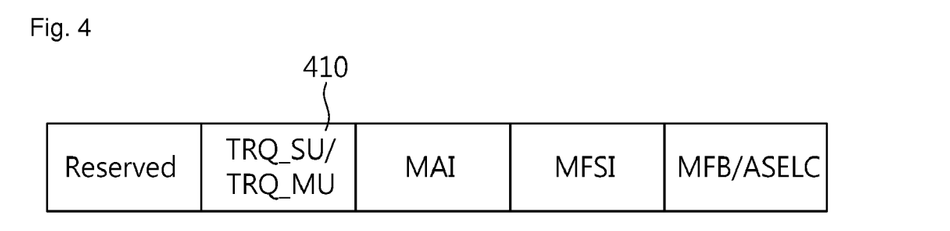
FIG. 4 shows an example of a modified link adaptation control field according to an embodiment of the present invention.

FIG. 4 shows an example of a modified link adaptation control field according to an embodiment of the present invention.

The modified link adaptation control field proposed in the present invention includes a TRQ_SU/TRQ_MU field 410 in which the TRQ field of the link adaptation control field of the IEEE 802.11n standard is modified. The TRQ_SU/TRQ_MU field 410 further includes additional information of (a) destination STA(s) on top of transmitting a sounding PPDU from (a) STA(s) receiving the frame.

The information on the destination STA may be a MAC address or an association ID (AID) of each destination STA, or may be a group ID which is an identifier of a destination STA group. For example, the AP can perform transmission by inserting the group ID in the TRQ_SU/TRQ_MU field 410 to each of STAs paired for a destination STA group in MU-MIMO transmission in order to request transmission of the sounding PPDU.

By confirming the TRQ_SU/TRQ_MU field 410, the STA can know whether an STA group which is a target of MU-MIMO transmission is a group to which the STA itself belongs. If the STA group is the group to which the STA itself belongs, the STA knows that the STA itself is the destination STA of MU-MIMO transmission and thus can transmit the sounding PPDU.

The STA can know information of the group to which the STA itself belongs by using various methods. For one example, the STA can obtain the information of the group to which the STA itself belongs by using a probe response frame or a beacon frame in a scanning process. For another example, by considering a channel correlation of STAs in a BSS, the AP can group STAs having a low channel correlation and report the grouping result (i.e., an identifier of each group and an identifier of STAs belonging to a group) to each STA.

Information indicating the destination STA (i.e., the group ID) can include identifier information of a plurality of destination STAs. The AP can transmit information on an identifier of each of destination STAs paired as a target STA of MU- MIMO transmission (e.g., an AID) to the destination STAs by using the group ID. Each destination STA confirms the group ID in order to confirm that the transmitted data is data for itself. In this case, if there is different information capable of identifying each destination STA, the AP can transmit the different information instead of the AID by using the group ID.

A length of the TRQ_SU/TRQ_MU field 410 may be variable according to the definition of the group ID and the number of paired STAs belonging to the group. For example, if the group ID has a length of 4 bits, a length of the link adaptation control field may increase by 3 bits. When the AP performs SU-MIMO transmission, the TRQ_SU/TRQ_MU field 410 is set to 1-bit TRQ_SU. When the AP performs MU-MIMO transmission, the TRQ_SU/TRQ_MU field 410 is set to TRQ_MU. As described above, the TRQ_MU includes identifier information of the destination STA, e.g., the group ID.

The TRQ_SU can be set to one of the states of the TRQ_MU. For example, it is assumed that the TRQ_MU has a length of 4 bits, the TRQ_MU can represent 16 states. In this case, One state of the 16 states can be reserved for TRQ_SU.

According to another embodiment of the present invention, an address field (e.g., a first address field) indicating a receiver of a MAC frame can be set to a group address (i.e., addresses of STA(s) indicated by a group ID) for indicating (a) destination STA(s) of MU-MIMO transmission. The STA receives the frame and confirms the group address from the receiver address field, and thus can recognize that the frame is a frame to be transmitted to STAs belonging to a paired STA group indicated by the group address.

An Ethernet address of the IEEE 802.3 standard uses a 48-bit address similarly to the IEEE 802.11 standard. As an example of the group address proposed in the present invention, an Ethernet multicast address can be used. Reserved addresses (e.g. from 03-00-00-01-00-00 to 03-00-40-00-00-00) in the Ethernet multicast address can be used by allocating them to the VHT WLAN system. As an alternative way of the group ID with 4 bits, 16 group addresses are required, and for this, addresses from 03-00-00-01-00-00 to 03-00-00-01-00-0F can be designated as a group address for the VHT WLAN.

Meanwhile, when the AP transmits data to the STA, from the perspective of the STA receiving the data, the data may be transmitted by being modulated and coded with an MCS value not suitable for capability of the STA or a channel condition between the AP and the STA. In addition, transmit power may be unnecessarily high or low and thus efficiency of power usage may decrease or transmission may not be properly achieved. Therefore, in order to perform a link adaptation process by using an MCS suitable for the channel condition and the capability of the STA, the STA needs to provide information indicating a suitable MCS in terms of power. According to the embodiment of the present invention, information indicating the MCS or information indicating excess or shortage of transmit power can be transmitted to the AP. The information indicating the MCS may be an MCS index value. The information indicating excess or shortage of transmit power may be information indicating whether the transmit power is unnecessarily high or low when the STA receiving data transmits the power related information to the AP.

Figure 5:
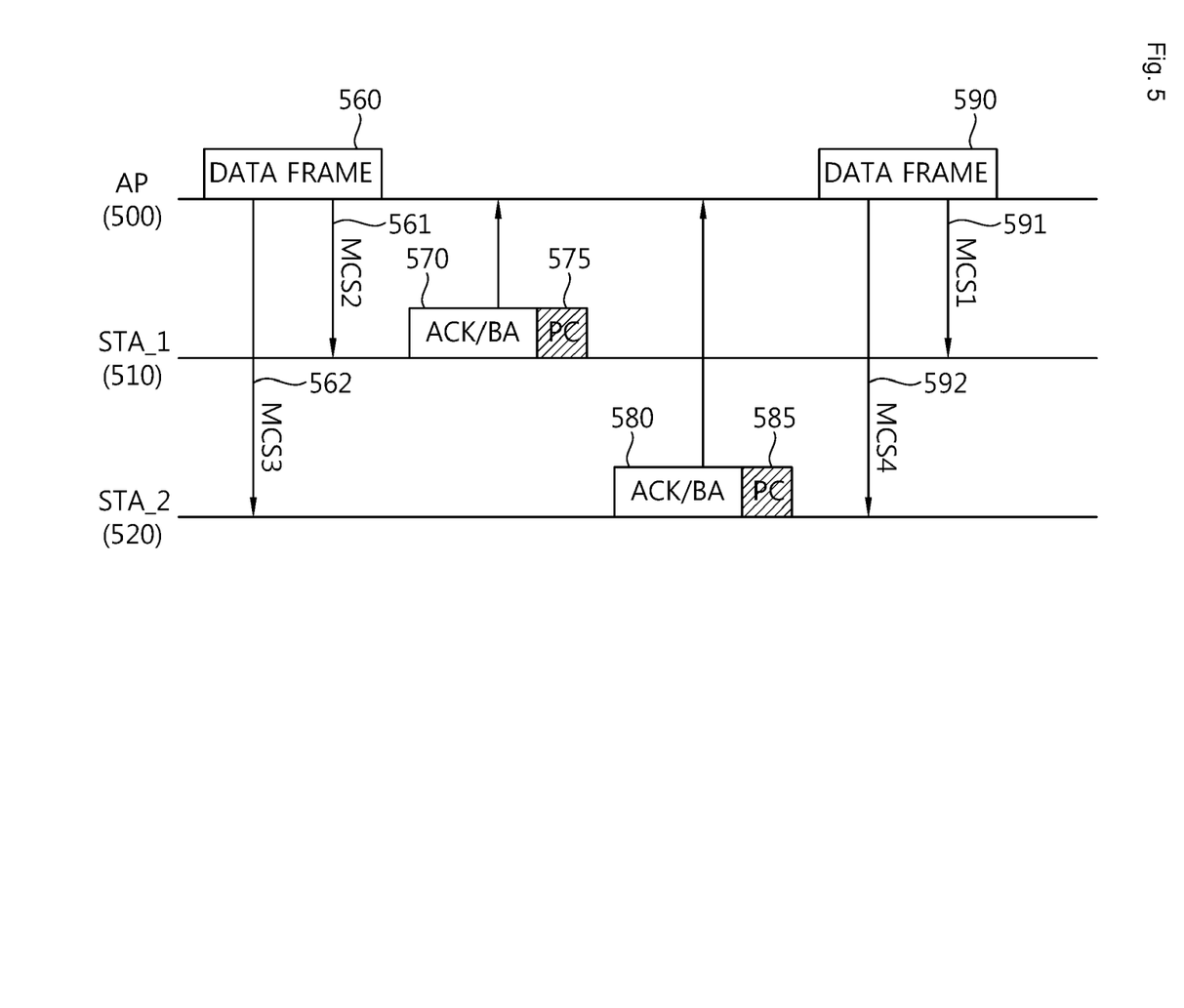
FIG. 5 shows an example of transmitting power control information to an access point (AP) according to an embodiment of the present invention.

FIG. 5 shows an example of transmitting power control information to an AP according to an embodiment of the present invention.

In the example of FIG. 5, an AP 500 transmits a data frame 560 to an STA_1 510 by using an MCS 2 (step 561), and transmits it to an STA_2 520 by using an MCS 3 (step 562).

An MCS value used in this case is calculated based on a result obtained by performing channel estimation by using a sounding PPDU received before transmission of the data frame 560 by the AP 500 from the STA_1 510 and the STA_2 520. The AP 500 transmits the data frame 560 to the STA_1 510 and the STA_2 520 by distributing transmit power within a range of maximum transmit power allowed to the AP 500 itself.

Upon receiving the data frame 560, each of the STA_1 510 and the STA_2 520 transmits an ACK or a block ACK (BA). In this case, a power control (PC) 575 may be included in the ACK frame 570 transmitted by the STA_1 510, or a PC 575 may be transmitted subsequently to the ACK frame 570. Herein, the PC 575 is PC information.

The STA_1 510 can determine whether transmit power of the data frame 560 is suitable and then transmit information indicating excess or shortage of transmit power to the AP 500 by including the information in the PC 560. The information indicating excess or shortage of transmit power can be obtained by the STA_1 510 by calculating a difference between an effective signal-to-noise ratio (SNR) corresponding to current channel capacity and an effective SNR corresponding to an MCS applied to a frame received from the AP. The STA_1 510 defines an offset value of the two effective SNR values to the PC 575 and transmits the offset value to the AP 500. Likewise, the STA_2 520 can also operate in the same manner as described above.

The AP 500 obtains the offset value by using the PC 575 and a PC 585, and by using the offset value, can re-calculate an MCS value suitable for a next data frame 590 or can re-coordinate transmit power distribution on the STA_1 510 and the STA_2 520.

Since the AP can regulate the channel condition and transmit power for each STA and an MCS to be applied adaptively to the capability of the STA, power consumption of the AP can be decreased and reliability of data transmission can be increased.

Adaptive distribution of transmit power by transmitting transmit power control information to the AP or determination on a size of transmit power can be utilized to increase reliability of data transmission by compensating with a method of selecting an MCS according to the channel condition.

A generally applicable MCS type may be limited. The increase in an MCS set which can be applied to define an optimal MCS according to the channel condition results in more significant overhead in every data transmission. Therefore, a certain restriction is imposed on the number of selectable MCSs. Table 1 shows an example of the MCS set supported in the WLAN system.

TABLE 1

| MCSindex | Modulation scheme | Coding rate | Required SNR (dB) |
| --- | --- | --- | --- |
| 0 | BPSK | ½ | 1 |
| 1 | QPSK | ½ | 4 |
| 2 | QPSK | ¾ | 6.5 |
| 3 | 16QAM | ½ | 9.75 |
| 4 | 16QAM | ¾ | 13 |
| 5 | 64QAM | ½ | 17.25 |
| 6 | 64QAM | ¾ | 18.75 |
| 7 | 64QAM | ⅚ | 19.75 |

In Table 1, the gaps of required SNRs are different by 3 dB or higher depending on the respective MCSs. In order to decrease power consumption of the AP while ensuring reliability of data transmission, an SNR unit which is not supportable by selecting an MCS can be compensated for by using PC information proposed by the present invention. In doing so, there is an advantage in that the link adaptation process can be performed properly also in a relatively reliable channel environment.

Before data transmission, the AP requests the STA to transmit a sounding frame to be used for channel estimation. The AP transmits data using the MCS determined by performing channel estimation on the basis of the sounding frame transmitted from the STA. However, the AP may not correctly apply an MCS most suitable reflecting a channel condition in a process of selection among the 8 MCSs shown in Table 1 above. This is because the gaps of required SNR values by the respective MCSs are significantly widened.

Upon receiving data, the STA can know a difference between the effective SNR corresponding to the current channel capacity and the effective SNR corresponding to the transmitted MCS. When an offset value of the two effective SNRs is transmitted to the AP, the AP can use the offset value so that next data is transmitted with transmit power being compensated for by using the offset value. For example, a unit SNR value for transmit power control can be set to 0.5 dB, 1 dB, etc. As a result, the AP can regulate transmit power by using an additionally subdivided value from a given MCS, and thus power consumption can be decreased while maintaining reliability of data transmission. In other words, when using MU-MIMO, available transmit power obtained by decreasing transmit power for an STA having a good channel condition can be used to increase transmit power for another STA, and thus the AP can perform effective system operations.

Transmission of transmit power control information proposed in the present invention can be achieved by being included in the MAC frame header. More specifically, it can be transmitted by being included in the VHT control field. For this, the VHT control field according to the embodiment of the present invention may further include a power control sub-field containing the aforementioned transmit power control information in addition to sub-fields constituting the HT control field of the IEEE 802.11n standard.

When the AP receives a frame having the MAC frame format according to the embodiment of the present invention, the AP obtains power control information included in the power control sub-field of the VHT control field constituting the MAC header, and on the basis of the obtained power control information, can regulate transmit power when transmitting data to each STA.

Although it has been described above that transmit power is regulated for each STA in MU-MIMO transmission as an exemplary method proposed in the present invention for obtaining transmit power control information from an STA and regulating transmit power by using transmit power control information, the present invention is not limited thereto, and thus can also equally apply to a case where data is transmitted for a single STA.

Figure 6:
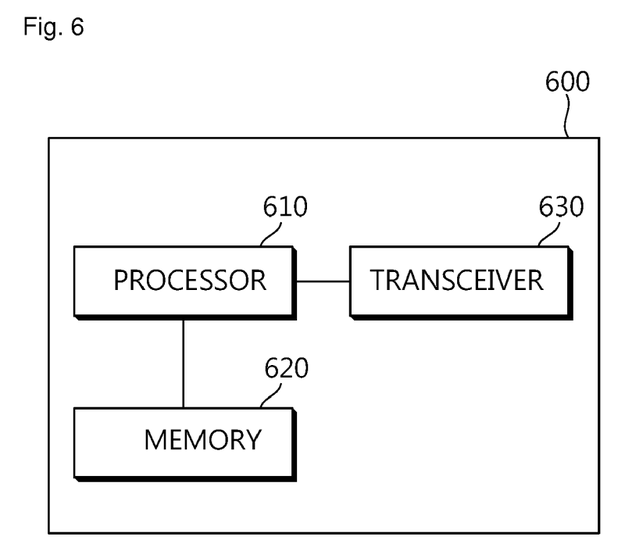
FIG. 6 is a block diagram showing an example of a wireless apparatus for implementing an embodiment of the present invention.

FIG. 6 is a block diagram showing an example of a wireless apparatus for implementing an embodiment of the present invention. A wireless apparatus 600 may be an AP or a non-AP STA.

The wireless apparatus 600 includes a processor 610, a memory 620, and a transceiver 630. The transceiver 630 transmits/receives a radio signal, and implements an IEEE 802.11 PHY layer. The transceiver 630 supports MU-MIMO transmission by using multiple antennas (not shown). The processor 610 is operationally coupled to the transceiver 630, and implements an IEEE 802.11 MAC layer. When the processor 610 processes an operation of an AP in the aforementioned method, the wireless apparatus 600 is the AP. When the processor 610 processes an operation of a non-AP STA in the aforementioned method, the wireless apparatus 600 is the non-AP STA. The processor 610 and/or the transceiver 630 may include an application-specific integrated circuit (ASIC), a separate chipset, a logic circuit, and/or a data processing unit. The memory 620 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 620 and may be performed by the processor 610. The memory 620 may be located inside or outside the processor 610, and may be coupled to the processor 610 by using various well-known means.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

The invention claimed is:

1. A method for a wireless local area network supporting multi-user multiple input multiple output (MU-MIMO), the method comprising:

transmitting, by a station, an association request frame to an access point (AP), the association request frame for requesting an association with the AP and including capability information indicating that the station supports receiving a very high throughput (VHT) control field;

receiving, by the station, an association response frame from the AP in response to the association request frame;

receiving, by the station, a Physical layer Protocol Data Unit (PPDU) from the AP, the PPDU including a group identifier that identifies a plurality of stations to receive the PPDU; and transmitting, by the station, a medium access control (MAC) frame to the AP, the MAC frame including a control bit, a modulation and coding scheme (MCS) feedback field and the VHT control field, the control bit having a length of one bit and being set to one to indicate that the MAC frame includes the VHT control field, the VHT control field of the MAC frame including a multi-user (MU) information, the MCS feedback field indicating a recommended MCS, wherein:

the MU information is set to a predefined value when the PPDU is transmitted by the AP via a single-user MIMO (SU-MIMO) transmission; and the MU information is set to a same value as the group identifier of the PPDU when the PPDU is transmitted by the AP via a MU-MIMO transmission in order to indicate that the recommended MCS is estimated from the PPDU that includes the group identifier.

2. The method of claim 1, wherein the MU information has at least 3 bits.

3. An apparatus for a wireless local area network supporting multi-user multiple input multiple output (MU-MIMO), the apparatus comprising:

a transceiver configured to transmit and receive radio signals; and a processor operatively coupled with the transceiver and configured to:

transmit, via the transceiver, an association request frame to an access point (AP), the association request frame for requesting an association with the AP and including capability information indicating that the apparatus supports receiving a very high throughput (VHT) control field;

receive, via the transceiver, an association response frame from the AP in response to the association request frame;

receive, via the transceiver, a Physical layer Protocol Data Unit (PPDU) from the AP, the PPDU including a group identifier that identifies a plurality of stations to receive the PPDU; and transmit, via the transceiver, a medium access control (MAC) frame to the AP, the MAC frame including a control bit, a modulation and coding scheme (MCS) feedback field and the VHT control field, the control bit having a length of one bit and being set to one to indicate that the MAC frame includes the VHT control field, the VHT control field of the MAC frame including multi-user (MU) information, the MCS feedback field indicating a recommended MCS, wherein:

the MU information is set to a first value when the PPDU is transmitted by the AP via a single-user MIMO (SU-MIMO) transmission; and the MU information is set to a same value as the group identifier of the PPDU when the PPDU is transmitted by the AP via a MU-MIMO transmission in order to indicate that the recommended MCS is estimated from the PPDU that includes the group identifier.

4. The apparatus of claim 3, wherein the MU information has at least 3 bits.

* * * * *